US012484938B2

(12) United States Patent
Yonezawa (10) Patent No.: US 12,484,938 B2
(45) Date of Patent: Dec. 2, 2025

(54) TREATMENT DEVICE AND SCREW

(71) Applicant: Spine Chronicle Japan Co., Ltd., Kanazawa (JP)

(72) Inventor: Noritaka Yonezawa, Ishikawa (JP)

(73) Assignee: SPINE CHRONICLE JAPAN CO., LTD., Ishikawa (JP)

( * ) Notice: Subject to any disclaimer, the term of this patent is extended or adjusted under 35 U.S.C. 154(b) by 0 days.

(21) Appl. No.: 18/565,507

(22) PCT Filed: Sep. 28, 2022

(86) PCT No.: PCT/JP2022/036147
§ 371 (c)(1),
(2) Date: Nov. 29, 2023

(87) PCT Pub. No.: WO2024/069795
PCT Pub. Date: Apr. 4, 2024

(65) Prior Publication Data
US 2024/0341823 A1  Oct. 17, 2024

(51) Int. Cl.
*A61B 17/88* (2006.01)
*A61B 17/70* (2006.01)
*A61B 17/86* (2006.01)

(52) U.S. Cl.
CPC ...... *A61B 17/7098* (2013.01); *A61B 17/8888* (2013.01)

(58) Field of Classification Search
CPC ......... A61B 17/56; A61B 17/88; A61B 17/86; A61B 17/8685; A61B 17/864
See application file for complete search history.

(56) References Cited

U.S. PATENT DOCUMENTS

2009/0187194 A1   7/2009  Hamada
2019/0053888 A1*  2/2019  Dougherty ......... A61B 17/0483

FOREIGN PATENT DOCUMENTS

JP    2010-534116 A    11/2010
JP    2016-019728 A     2/2016
(Continued)

OTHER PUBLICATIONS

International Search Report for International Patent Application No. PCT/JP2022/036147, Nov. 22, 2022.
(Continued)

*Primary Examiner* — Samuel S Hanna
(74) *Attorney, Agent, or Firm* — Potomac Law Group, PLLC (57) ABSTRACT

This invention relates to a treatment device suitable for combined operative procedure of vertebroplasty and pediculoplasty. A treatment device includes a cylindrical driver capable of driving a screw into bone, an inner sleeve capable of being inserted into the driver, and a guide pin capable of being inserted into the inner sleeve, and is configured as follows. The screw includes on an outer wall (outer circumference) a thread that can tap into bone or cement, and a through hole that allows the inner sleeve to pass from a head to a tip. The driver can fit onto the head of the screw and when moved along the central axis and be joined to the screw, so as to transmit torque about the central axis to the screw. The inner sleeve includes a notch which protrudes, when the inner sleeve is inserted from the distal end of the driver in a state in which the screw and the driver are joined together, protrudes more proximally than a tip of the screw, preventing removal of the screw.

7 Claims, 8 Drawing Sheets

(56) References Cited

FOREIGN PATENT DOCUMENTS

| | | |
|---|---|---|
| JP | 2016-209295 A | 12/2016 |
| JP | 2019-136504 A | 8/2019 |
| JP | 2019-521790 A | 8/2019 |

OTHER PUBLICATIONS

English machine translation of Notice of Reasons for Refusal issued Mar. 15, 2023, in Japanese Patent Application No. 2022-574438.
English machine translation of Notice of Reasons for Refusal issued May 22, 2023, in Japanese Patent Application No. 2022-574438.
English machine translation of Notice of Reasons for Refusal issued Jun. 26, 2023, in Japanese Patent Application No. 2023-090298.

* cited by examiner

(a) inner sleeve can move in the through hole of the screw (b) inner sleeve is fixed at the proximal end of the screw

TREATMENT DEVICE AND SCREW

TECHNICAL FIELD

The present invention relates to a treatment device and a screw, and more particularly to a treatment device and a screw suitable for use in surgery to fill affected bone with cement from inside in advance and drive a screw into the cement from outside of the bone.

BACKGROUND ART

As medical treatment for spinal degenerative diseases, spinal fusion and artificial disc replacement are known. In addition, as medical treatment for spinal compression fractures, vertebroplasty and spinal fusion are known. A spine consists of stacked vertebral bodies, vertebral lamina that support and connect the vertebral bodies vertically, pedicles, and superior and inferior articular processes. The vertebral bodies are cylindrical bones placed to sandwich the nucleus pulposus and the surrounding disc annulus, each vertebral body being supported by left and right pedicles extending from the vertebral arch. The vertebral lamina are connected vertically by the superior and inferior articular processes to support each of the vertebral bodies via the pedicles and form a spine. Compression fracture is a condition in which the vertebral body is crushed and damaged due to vertical compression. Vertebroplasty is surgery to reconstruct a crushed vertebral body. For vertebroplasty, for example, an operative procedure of filling the vertebral body with medical cement is employed. Spinal fusion is an operative procedure of fixing an affected vertebrae for spinal degenerative diseases, and is an operative procedure of fixing uninjured vertebral bodies above and below an affected vertebral body using an instrument for compression fractures. Artificial disc replacement is an operative procedure of inserting an artificial disc between affected vertebrae. In spinal fusion, screws are driven into multiple vertebral bodies, each through a pedicle, and then heads of the screws are connected to vertically placed rod so as to fix affected vertebrae or fractured vertebral bodies. Depending on the conditions of the affected vertebral bodies, spinal fusion, artificial disc replacement, or vertebroplasty may be employed selectively or in combination thereof for each disease.

Various medical instruments and screws for use in such medical treatment have been proposed.

PTL 1 discloses a screwdriver for driving a screw into a vertebral body through a pedicle. The screwdriver includes a shank for rotating a pedicle screw, a clamping sleeve that support the shank to rotate about it, and an adapter sleeve attached to the clamping sleeve to transmit torque from a handle. The adapter sleeve is removable, and may be removed to leave the shank and the clamping sleeve connected to the pedicle screw, which can improve a surgeon's view of the treatment point (paragraphs 0014-0015).

PTL 2 discloses a medical instrument for spinal fusion to interconnect a spinal rod with a patient's vertebra. A bone anchor (bone screw) implanted in the vertebra is connected to a rod extending along the spine using various components.

PTL 3 discloses a medical screw capable of being easily removed from a screwed-in fracture site. The medical screw is hollow from the head along the central axis, has an external thread, and has a reverse internal thread near an internal hollow tip, which is in the opposite direction of the external thread. A hexagonal wrench (FIG. 3) engaging with a hexagonal groove on the head is used to drive the medical screw, and a removal operation jig (FIG. 7) with reverse external thread engaging with the reverse internal thread at the tip is used to remove the medical screw.

New techniques have also been proposed.

Vertebroplasty is a percutaneous procedure, meaning less invasive and less burden on patients, contributing to shorter hospital stays and, ultimately, lower medical and nursing care costs. Although percutaneous vertebroplasty has achieved favorable results in many cases, complications of dislocation of filled cement have been reported. To prevent such complications, a method of filling cement and then inserting a screw into cement mass from a pedicle before the cement hardens to internally fix (reconstruct) the fractured vertebra (a combined operative procedure of vertebroplasty and pediculoplasty) was proposed (see Yonezawa, et al, "Percutaneous vertebroplasty for osteoporotic vertebral pseudoarthrosis using polymethylmethacrylate and intravertebral screw", Journal of Japanese Society for Fracture Repair, 2006, Vol. 28, pp. 444-448, Japanese Society for Fracture Repair). This method has been applied to many patients with favorable results. This technique is effective not only to vertebroplasty for compression fracture, but also to spinal fusion, and as a spinal augmentation technique for lumbar artificial disc replacement for spinal degenerative diseases with osteoporosis.

CITATION LIST

Patent Document

PTL 1: Japanese Patent Application Laid-Open No. 2016-19728

PTL 2: Japanese Unexamined Patent Application Publication (Translation of PCT Application) No. 2010-534116

PTL 3: Japanese Patent Application Laid-Open No. 2016-209295

SUMMARY OF THE INVENTION

Problem to be Solved by the Invention

The inventor has found a problem that development of medical instruments and screws suitable for operative procedures using artificial disc replacement, spinal fusion, vertebroplasty, and pediculoplasty in combination for spinal disease with osteoporosis is insufficient.

Today, in lumbar spinal fusion and artificial disc replacement for spinal degenerative disease with osteoporosis, there is a widespread problem of complications caused by fragile underlying spinal bone: for example, an artificial vertebral disc replacement material or an artificial vertebral disc called a cage penetrates a vertebral body wall (endplate) and settles down, and screws are loosened. Spinal augmentation is not sufficient in these medical procedures. Among these operative procedures, augmentation of vertebral bodies with cement is not practical for the reason stated below. After drilling a through hole from outside a body (back) through the pedicle to reach the vertebral body and then drilling the vertebral body with a balloon or other device through that through hole from outside the body, cement is injected, and then a screw is driven into cement mass. If it takes too long to drive the screw after the cement is injected, the cement mass will become too hard to allow screwing-in of the screw.

The screwdriver disclosed in PTL 1 functions also as a cement injection cannula and is able to inject cement into the pedicle screw via the shank without replacing the instruments (paragraphs 0058 to 0068). However, it is not contemplated to drive the screw into the cement mass after cement is injected, as described "immediately after screwing-in of the pedicle screw, without replacing the instruments, cement can be injected through shank 2 into pedicle screw 30 into which the cannula has been inserted" (paragraph 0068).

In the medical instrument disclosed in PTL 2, bone cement is injected into a cannulated bone anchor using an injection assembly shown in FIG. 9A. The cannula of the injection assembly is securely sealed to the head of the bone anchor by the structure shown in FIG. 9B, thereby preventing leakage of bone cement into the joint (paragraph 0054). However, even in this reference, it is not contemplated to drive the screw into the cement mass after the cement is injected, as described "The bone screw 22 may further be cannulated and fenestrated (not shown) such that openings extend outwardly from a central hollow channel in a cannulated screw to urge fluid out of the screw during insertion or draw fluid into the central hollow channel from sides of the screw during extraction of material adjacent the screw." (paragraph 0017).

Even though in these medical instruments it is not contemplated to drive the screw into cement mass after injection of cement, such use is not impossible. However, since instruments such as drivers that drive the screws also function as cannulae through which cement is passed so as to save efforts (and time) of replacing instruments for injecting of cement, washing out the cement after use is huge burden. In many cases, instruments used for passing cement are forbidden to be reused and are supposed to be disposable (disposal).

Also in many cases, the screw into which the cement is injected has a side opening to urge cement out (see paragraph 0017 of PTL 2 cited above). This is another means for filling cement around the screw instead of driving the screw into cement mass after injecting cement. Many medical instruments other than PTL 2 are constructed based on this method. However, the risk of causing complications is pointed out in medical treatment in which cement is poured using such a screw with the side hole (side opening to urge cement out). Injection of cement through the screw's side hole can lead pulmonary embolism due to conspired factors that the side hole is small, that cement should be filled at high pressure, and that cement should be filled with no cement filling space. This can cause cement to flow outside the vertebral body with the bloodstream, which is reported as a serious complication. Therefore, these instruments cannot be specified as demonstrating performance sufficiently suitable as treatment devices.

The inventor, an orthopedic surgeon, also found another challenge: the potential future need to remove the screw has not been fully considered in either case where the screw is driven into cement mass after cement is injected or where a joint between the screw and its surrounding bone is to be reinforced by urging cement from a side discharge port after the screw is driven in. In fact, there have never developed such a symptom that requires removal of a screw in a combined vertebroplasty and pediculoplasty procedure. However, in general, if a bacterial infection has developed in the vertebra where a screw has been inserted, or if symptoms of an inserted screw accidentally irritating a nerve are identified at a later date, it is possible that removal of the screw may be necessary. In addition, removal of a screw need to be considered in advance, since the screw must be replaced with one capable of being connected to a rod for spinal fusion, for example, when symptoms worsen at a later date and the need arises to perform multiple intervertebral spinal fusion procedures.

In addition, whether the screw is driven into cement mass the after cement is injected or where a joint between the screw and its surrounding bone is to be reinforced by urging cement from a side discharge port after the screw is driven in, the screw is difficult to remove after reinforcement with cement. If a screw is driven into cement mass prior to fully hardened, it is very difficult to pull the screw out after the hardening of the cement. If cement is poured from a discharge port on a screw side wall, the cement remaining in a screw lumen and the cement outside will harden while joined at the discharge port, to thereby disturb turning of the screw. And the cement at the discharge port need to be broken by the turning of the screw.

Although the screw disclosed in PTL 3 is proposed regarding removal of a screw that has been driven into a bone, for example, it is necessary to attach a removal operation jig (FIG. 7 in PTL 3) to the screw in order to remove the screw. For this purpose, the screw lumen must be hollow, meaning that cement cannot be injected through the lumen. Even if cement is injected through the lumen, no cement should be left in the lumen.

As described above, none of the related art medical instruments is sufficiently suitable for a combined operative procedure of vertebroplasty and pediculoplasty as described above, and also for operative procedures of spinal fusion, vertebral augmentation for artificial disc replacement, vertebroplasty, and pediculoplasty for spinal degenerative diseases and fractures with osteoporosis.

An object of the present invention is to provide a treatment device and a screw suitable for surgery of spinal fusion, vertebral augmentation for artificial disc replacement, vertebroplasty, and pediculoplasty for spinal degenerative diseases with osteoporosis and fractures. Another object of the invention is to minimize the number of instruments used for cement filling and to reduce the burden of cleaning, or to reduce "single use" for avoiding cleaning. Yet another object of the invention is to facilitate removal of a screw.

While means for solving these problems will be described below, other problems and novel features will become apparent from the description herein and the accompanying drawings.

Means for Solving Problems

One aspect of the invention is as follows.

A treatment device comprising: a cylindrical driver capable of driving a screw into bone; an inner sleeve capable of being inserted into the driver; and a guide pin capable of being inserted into the inner sleeve, wherein the treatment device is configured as follows.

The screw includes on an outer wall (outer circumference) a thread that can tap into bone, and a through hole that allows the inner sleeve to pass from a head to a tip along a central axis.

The driver is configured to fit onto the head of the screw and when moved along the central axis and be joined to the screw, so as to transmit torque about the central axis to the screw.

The inner sleeve includes a tip which is, when the inner sleeve is inserted from a distal end of the driver through the through hole of the driver and the screw in a state in which the screw and the driver are joined together, protrudes more proximally than a tip of the screw. The inner sleeve is connected to the screw when the guide pin is inserted with the tip of the inner sleeve protruding more proximally than the tip of the screw. Here, "proximal" is a medical term denoting the side closer to the centerline of a patient's body, and "distal" denotes the side farther thereto. Cement here is a medical bone cement, is mainly composed of, e.g., calcium phosphate and polymethylmethacrylate, and hardens over time.

Effect of the Invention

The following is brief description of the effects produced by the aspect described above.

That is, a treatment device suitable for operative procedures of artificial disc replacement for spinal disease, spinal fusion, vertebroplasty, and pediculoplasty can be provided.

DETAILED DESCRIPTION OF THE INVENTION

1. Summary of Embodiment

First, a summary of a typical embodiment disclosed in the present application will be provided. Reference numerals in the drawings referred to in parentheses in this summary of description of the typical embodiment are merely illustrative of what are included in the concept of the components to which the numerals are attached.

Figure 1:
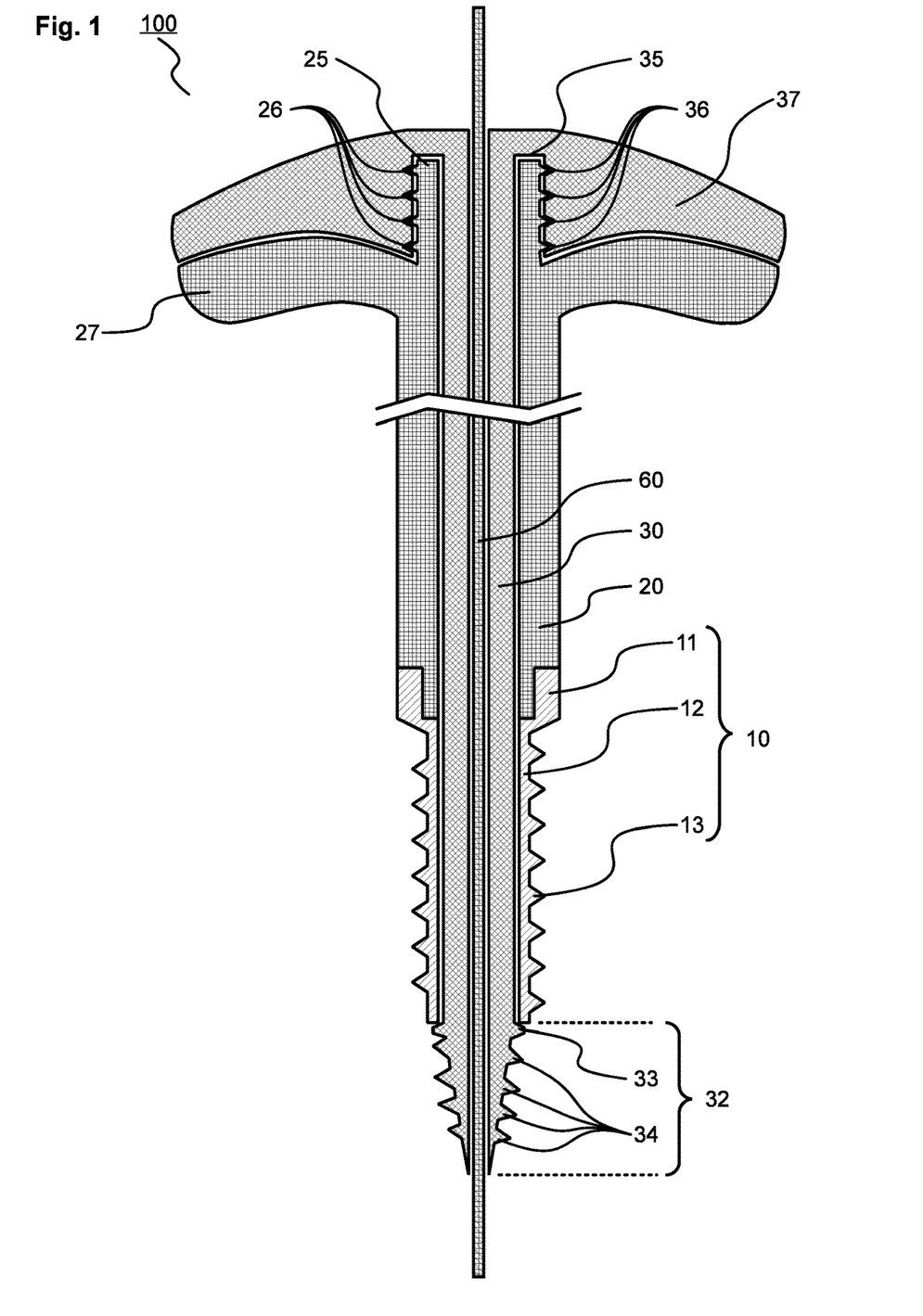
FIG. 1 is a schematic explanatory view of a cross-sectional structure illustrating an exemplary structure of a treatment device according to a first embodiment of the invention.

[1] Treatment Device in which Cylindrical Driver and Inner Sleeve are Integrated when Guide Pin is Inserted (FIG. 1)

A typical embodiment disclosed in this application is treatment device (100) comprising: cylindrical driver (20) capable of driving screw (10) into bone; inner sleeve (30) capable of being inserted into the driver; and guide pin (60) capable of being inserted into the inner sleeve. Treatment device (100) is configured as follows.

The screw includes self-tapping thread (13) on an outer wall, and a through hole that allows the inner sleeve to pass from head (11) to the tip along a central axis. Here, "self-tapping thread" refers to a thread capable of removing the material around it as the screw is driven to form a threaded groove that engages with the thread.

The driver is configured to fit onto the head of the screw and when moved along the central axis and be joined to the screw, so as to transmit torque about the central axis to the screw.

The inner sleeve includes tip (32) which is, when the inner sleeve is inserted from a distal end of the driver through the through hole of the driver and the screw in a state in which the screw and the driver are joined together, protrudes more proximally than a tip of the screw.

The inner sleeve can be inserted from the distal end of the driver and connected to the driver at distal ends (35, 36, 25, 26) in a state in which the driver and the screw are joined together, and the tip of the inner sleeve protrudes more proximally than the tip of the screw.

The inner sleeve is connected to the screw when the guide pin is inserted with the tip of the inner sleeve protruding more proximally than the tip of the screw.

In this manner, a treatment device suitable for combined operative procedures of artificial disc replacement for spinal disease, spinal fusion, vertebroplasty, and pediculoplasty can be provided.

Figure 2:
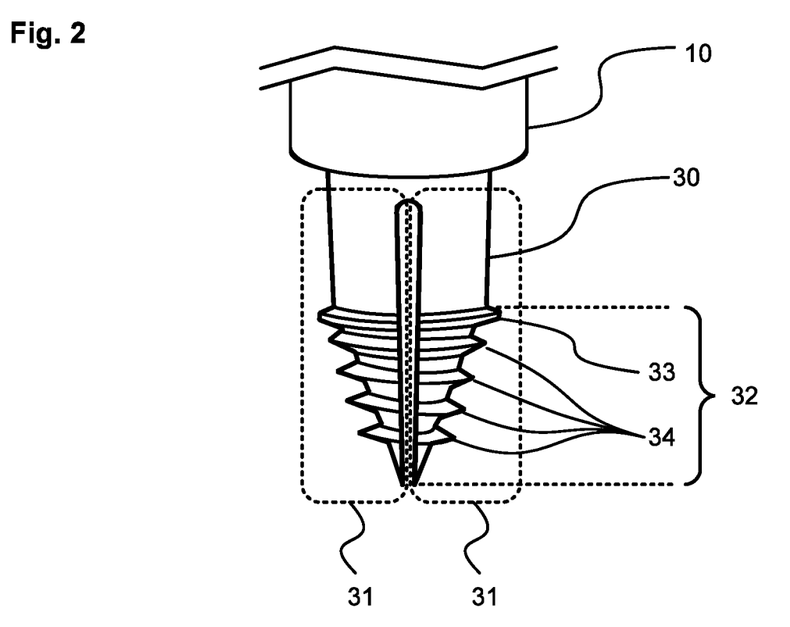
FIG. 2 is a perspective explanatory view illustrating an exemplary structure of a tip of an inner sleeve.
Figure 3:
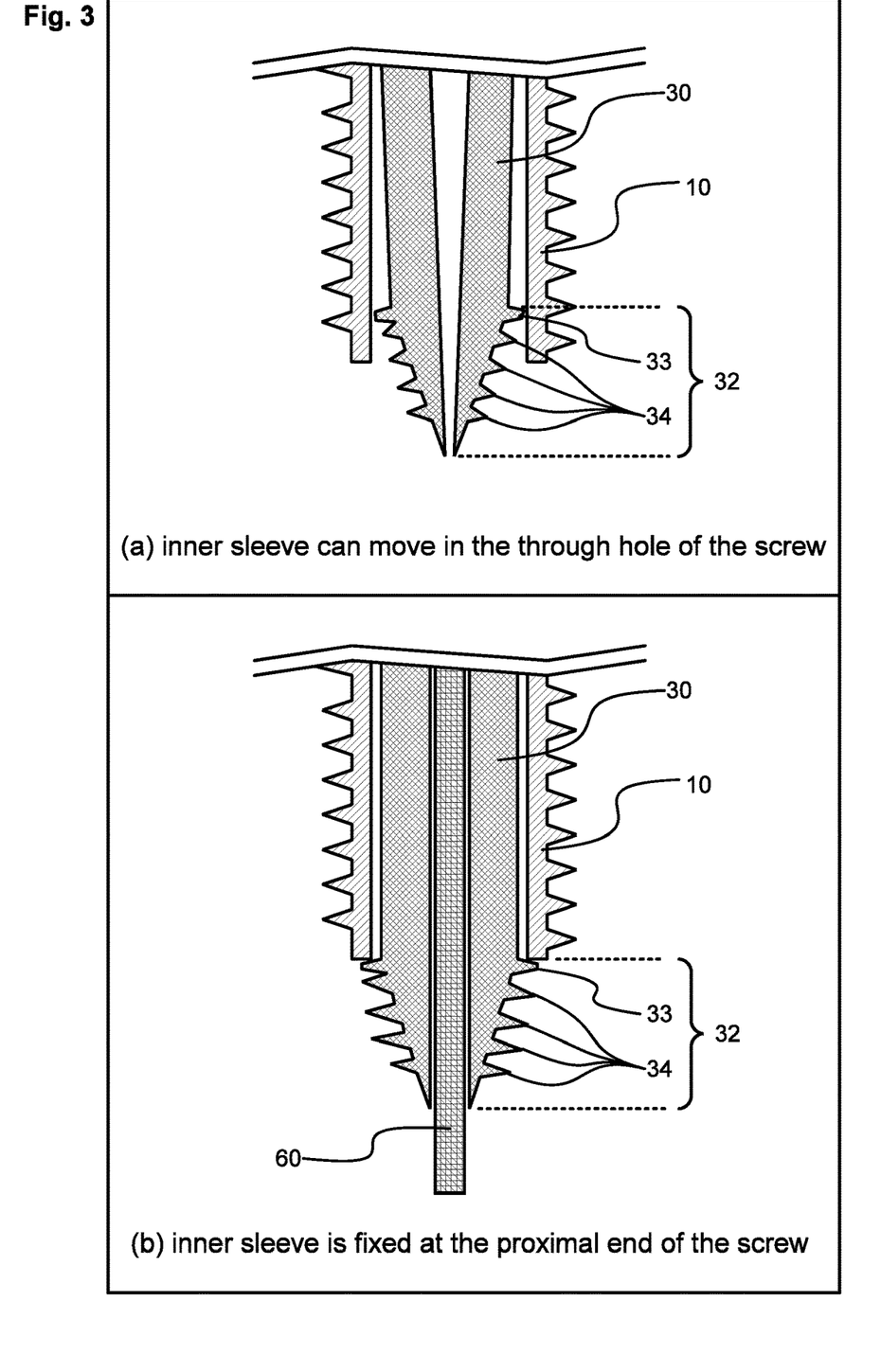
FIG. 3 is a schematic explanatory view of a cross-sectional structure illustrating an exemplary structure of the tip of the inner sleeve.

[2] Joint Means of Screw, Driver and Inner Sleeve (FIGS. 1 to 3)

In treatment device (100) of [1], the proximal end of the inner sleeve is divided into a plurality of tongues (31) in a direction along the central axis, each of the plurality of tongues having protrusion (33) in a direction away from the central axis.

When the inner sleeve is inserted into the joined driver and screw, the tongues bend toward the central axis to allow the inner sleeve to move toward the central axis in the through hole of the driver and the screw (FIG. 3 upper side). When the inner sleeve is inserted into the joined driver and screw and is connected at the distal end with the driver, the guide pin is inserted into the inner sleeve, thereby regulating the plurality of tongues not to bend in the direction of the central axis, and the protrusion is brought into contact with the tip of the screw, thereby regulating the movement of the inner sleeve back along the central axis in the direction of the through hole of the screw (FIG. 3, lower side). In other words, the protrusion protrudes further outward (in the direction away from the central axis) than the inner wall of the screw's through hole and regulates the screw not to slip out of the inner sleeve.

This simplifies the operation of integrating the screw, driver, and inner sleeve. That is, the screw, driver, and inner sleeve can be joined when the guide pin is inserted and be separated when the guide pin is removed.

[3] Tapping Thread Also at Tip of Inner Sleeve

In treatment device (100) of [1] or [2], the inner sleeve includes self-tapping thread (34) on an outer circumference of the tip.

This can reduce resistance when driving a screw into the vertebrae.

Figure 6:
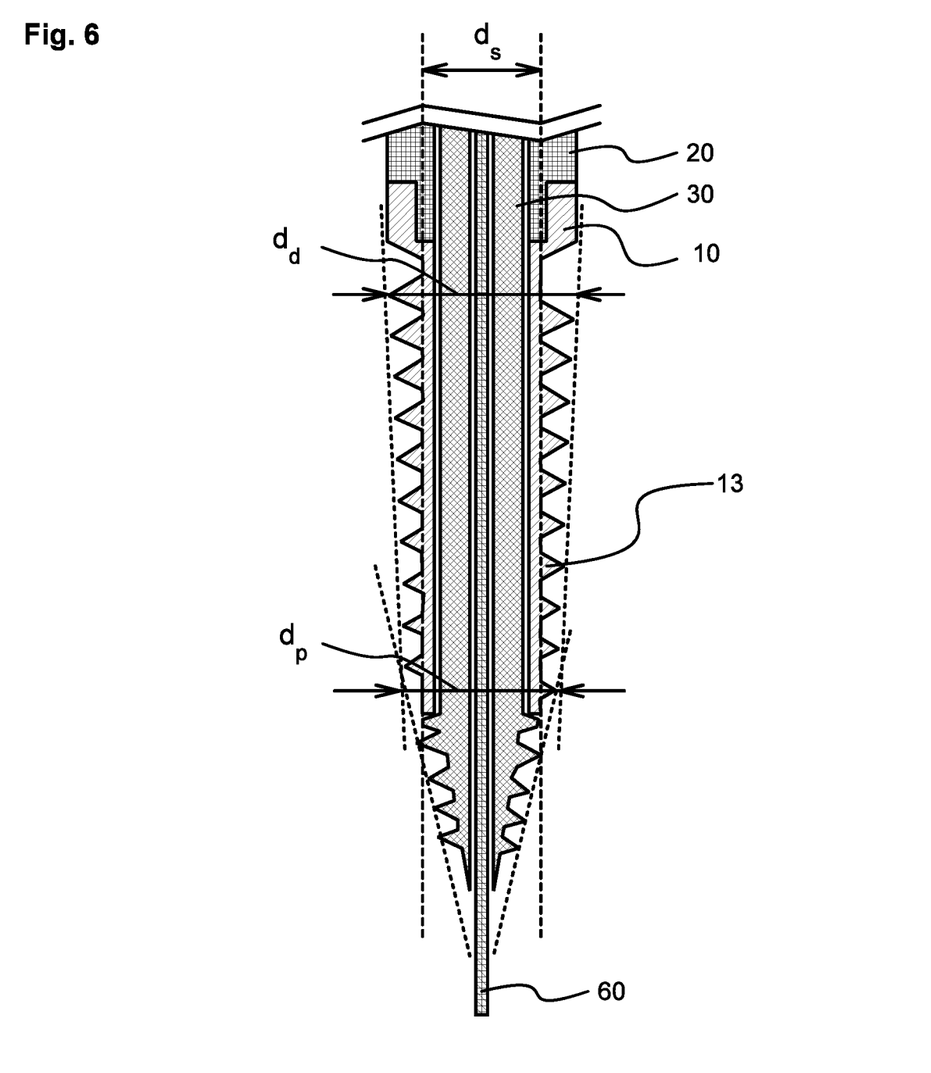
FIG. 6 is a schematic explanatory view of a cross-sectional structure illustrating an exemplary structure of a screw according to a second embodiment of the invention.

[4] Major Diameter of Screw Thread: Smaller on Proximal End (FIG. 6)

In treatment device (100) of [1] to [3], the major diameter of the screw thread is larger on the distal side ($d_a$) and smaller on the proximal side ($d_p$).

This facilitates removal of the screw.

[5] Thread of Screw: The Number of Lead Threads Decreases from the Distal Side to the Proximal Side (FIG. 7).

In treatment device (100) of [1] to [3], the number of lead threads of the screw is larger on the distal side and smaller on the proximal side. Here, "the lead threads" refers to the crests in a thread, and the number of lead threads is a numerical value representing the number of crests together with roots involved therewith.

This facilitates removal of the screw.

Figure 7:
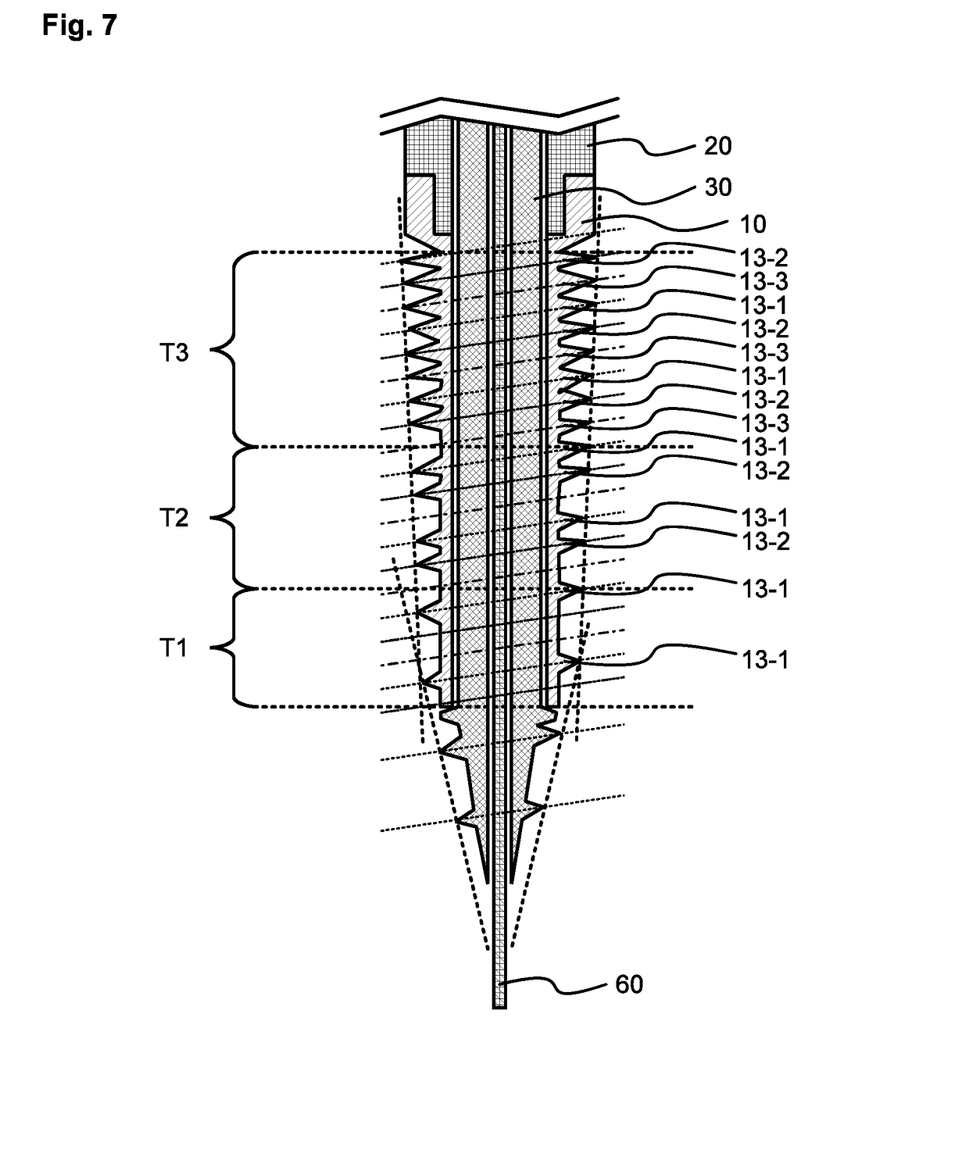
FIG. 7 is a schematic explanatory view of a cross-sectional structure illustrating an exemplary structure of a screw according to a third embodiment of the invention.

[6] The Major Diameter of Screw Thread is Smaller on the Proximal Side and the Number of Lead Threads Decreases Toward the Proximal Side (FIG. 7).

In treatment device (100) of [1] to [3], the major diameter of the screw thread is larger on the distal side and smaller on the proximal side, and the number of lead threads is larger on the distal side and smaller on the proximal side.

With both the features of [4] and [5] above, removal of the screw can be made even easier.

This invention may also be considered as an invention of a screw alone.

[7] Screw: Major Diameter Becomes Smaller on Proximal End (FIG. 6)

A typical embodiment disclosed in this application is a screw (10) which includes, on the outer wall, a thread that can tap into bone when the screw is driven in, and the major diameter of the thread is larger on the distal side and smaller on the proximal side.

This provides a screw that is easy to remove.

[8] Screw: The Number of Lead Threads Decreases from the Distal Side to the Proximal Side (FIG. 7).

A typical embodiment disclosed in this application is screw (10) that includes on an outer wall a thread that can tap into bone when the screw is driven, and the number of lead threads of the screw is larger on the distal side and smaller on the proximal side.

This provides a screw that is easy to remove.

[9] The Major Diameter of Screw Thread is Smaller on the Proximal Side and the Number of Lead Threads Decreases Toward the Proximal Side (FIG. 7).

A typical embodiment disclosed in this application is a screw (10) which includes, on the outer wall, a thread that can tap into bone when the screw is driven in, the major diameter of the screw thread is larger on the distal side and smaller on the proximal side, and the number of lead threads in the thread of the screw is larger on the distal side and smaller on the proximal side.

With both the features of [6] and [7] above, a screw that is even easier to remove can be provided.

2. Detailed Description of Invention

Embodiments of the invention will be described in further detail.

First Embodiment

FIG. 1 is a schematic explanatory view of a cross-sectional structure illustrating an exemplary structure of a treatment device according to a first embodiment of the invention. To facilitate understanding the invention, FIG. 1 is drawn with a compressed scale toward the central axis (up and down on the paper) and with emphasis on the direction along the patient's body surface (left and right on the paper). The same is true for the other drawings.

Treatment device 100 of the invention includes cylindrical driver 20 capable of driving screw 10 into bone, inner sleeve 30 capable of being inserted into driver 20, and guide pin 60 capable of being inserted into inner sleeve 30. Treatment device 100 is configured as follows.

The tip of screw 10 is rounded so that soft vertebral drilling devices such as balloons can come out of and retract into the tip. Screw 10 includes, on an outer wall, thread 13 that can tap into bone or cement, and a through hole that allows inner sleeve 30 to pass from head 11 to a tip along a central axis. Driver 20 is configured to fit onto head 11 of screw 10 and when moved along the central axis and be joined to screw 10, so as to transmit torque about the central axis to screw 10. For example, it is desirable that the tip of driver 20 is hexagonal wrench-shaped (hexagonal prism) and head 11 of screw 10 has a hexagonal groove (recess). The shape of the driver tip and screw head can be any shape other than hexagonal, e.g., star-shaped, as long as they engage simply by insertion. When driver 20 is slid along the central axis onto the head of screw 10, the tip of driver 20 is fit into head 11 of screw 10, allowing the screw to be driven by driver 10. When driver 10 is pulled out, the tip is removed easily. The structure on the head side of the screw may have an additional structure with a U-shaped passage (not shown) that can hold a spinal fusion rod in place if necessary.

Inner sleeve 30 includes tip 32 which is, when inner sleeve 30 is inserted from a distal end of driver 20 through the through holes of driver 20 and screw 10 in a state in which screw 10 and driver 20 are joined together, protrudes more proximally than the tip of screw 10. Inner sleeve 30 is connected to screw 10 when guide pin 60 is inserted in a state in which tip 32 protrudes more proximally than the tip of screw 10.

This provides a treatment device suitable for operative procedures of artificial disc replacement for spinal disease, spinal fusion, vertebroplasty, and pediculoplasty.

An exemplary structure for integrating screw 10, driver 20, and inner sleeve 30 will be described below.

As illustrated in FIG. 1, driver 20 and inner sleeve 30 are configured to be connected at their distal ends. At the distal end of driver 20, a cylindrical connecting portion 25 with male thread 26 cut on an outer circumference is provided. At a distal end of inner sleeve 30, a groove-shaped connecting portion 35 to accommodate the sleeve is provided and female thread 36 engaging with male thread 26 formed. The relationship between the protrusions and grooves, the male thread and the female thread may be reversed, or other connection mechanisms may be employed. As illustrated in FIG. 1, desirably driver 20 has handle 27, and inner sleeve 30 has handle 37, which are to be integrated with each other for easy gripping. In such a connection with a thread as in this example, a latch mechanism (not shown) may be provided to prevent disconnection.

As shown in FIG. 2, the tip (proximal end) of inner sleeve 30 is divided into a plurality of tongues 31 along the central axis, and each of the plurality of tongues 31 has a protrusion 33 in the direction away from the central axis. Protrusion 33 functions as a notch that regulates screw 10 not to be pulled out of inner sleeve 30 as described below; the reference numeral 33 denotes a notch.

The plurality of tongues 31 are formed, for example, by dividing the cylindrical inner sleeve 30 by slitting from the tip side. The number of divisions can be any number, for example, 4, 6, 2, or 3. To provide adequate elasticity, some processing (e.g., heat treatment, thickness reduction, lamination of highly elastic metals) may be performed. Tongues 31 are designed to be moderately flexible. For example, when inner sleeve 30 passes through the through hole of driver 20, notch 33 is urged against an inner wall of the through hole and is bent toward the central axial to allow the passage of inner sleeve 30, and when notch 33 exits more proximally than the tip of screw 10, bend of notch 33 is released to cause notch 33 to be caught on the tip of screw 10. With rounded notch 33, even after notch 33 exits from the tip of screw 10, notch 33 can be pulled into the through hole of screw 10 with the force of pulling inner sleeve 30, and then inner cylinder 30 can be pulled out by bending tongue 31 again toward the central axis.

It is more desirable that the tip of screw 10 is smoothly chamfered. In the bone treatment method that combines vertebroplasty and pediculoplasty, which will be described below with reference to FIGS. 4 and 5, in a sixth step ([6]) in which balloon 81 is introduced through the through hole in screw 10 into vertebral body 3, inflated, and then removed. A chamfered tip of screw 10 can lower the risk of damaging balloon 81 touching the tip of screw 10.

Return to the explanation of the mechanism for integrating screw 10, driver 20, and inner sleeve 30.

FIG. 3 is a schematic explanatory view of a cross-sectional structure illustrating an exemplary structure of tip 32 of inner sleeve 30. As shown in FIG. 3(a) on the upper side, when inner sleeve 30 is inserted into the joined driver 20 and screw 10, tongues 31 described above bend along the central axis to allow inner sleeve 30 to move through the through hole toward the central axis. As shown in FIG. 3(b) on the lower half, when inner sleeve 30 is inserted into the joined driver 20 and screw 10 and is connected at the distal end with inner sleeve 30 as described above, tip 32 protrudes more proximally than the tip of screw 10, and bend of tongue 31 is released to cause notch 33 to touch the tip of screw 10. Since guide pin 60 has been inserted into inner sleeve 30 in this state, tongue 31 cannot bend toward the central axis when inner sleeve 30 is to be pulled out, notch 33 protrudes further than the diameter of the through hole of screw 10, thereby regulating the movement of inner sleeve 30 along the central axis in the distal direction, i.e., returning the through hole of screw 10. Simply put, when screw 10 is to be pulled out of inner sleeve 30, notch 33 contacts the tip of screw 10 and prevents pulling out of screw 10.

This simplifies the operation of integrating screw 10, driver 20, and inner sleeve 30. That is, screw 10, driver 20, and inner sleeve 30 can be integrated by inserting guide pin 60 and separated from each other by removing guide pin 60.

It is more desirable if tip 32 of inner sleeve 30 includes, on the outer surface, thread 34 that can tap hole. Thread 34 is desirably formed at such a position that when screw 10, driver 20, and inner sleeve 30 are integrated as described above, thread 34 will joined smoothly to thread 13 of screw 10. "Joined smoothly" indicates that thread 13 of screw 10 can, when further driven, pass through the threaded groove formed by driven thread 34 of inner sleeve 30.

This reduces resistance when screw 10, driver 20, and inner sleeve 30 are integrated and driven into bone, allowing the practitioner to drive them into the bone without exerting a great deal of force.

The following describes a treatment method for artificial disc replacement, spinal fusion, vertebroplasty, and pediculoplasty for spinal disorders using treatment device 100 of the invention.

Figure 4:
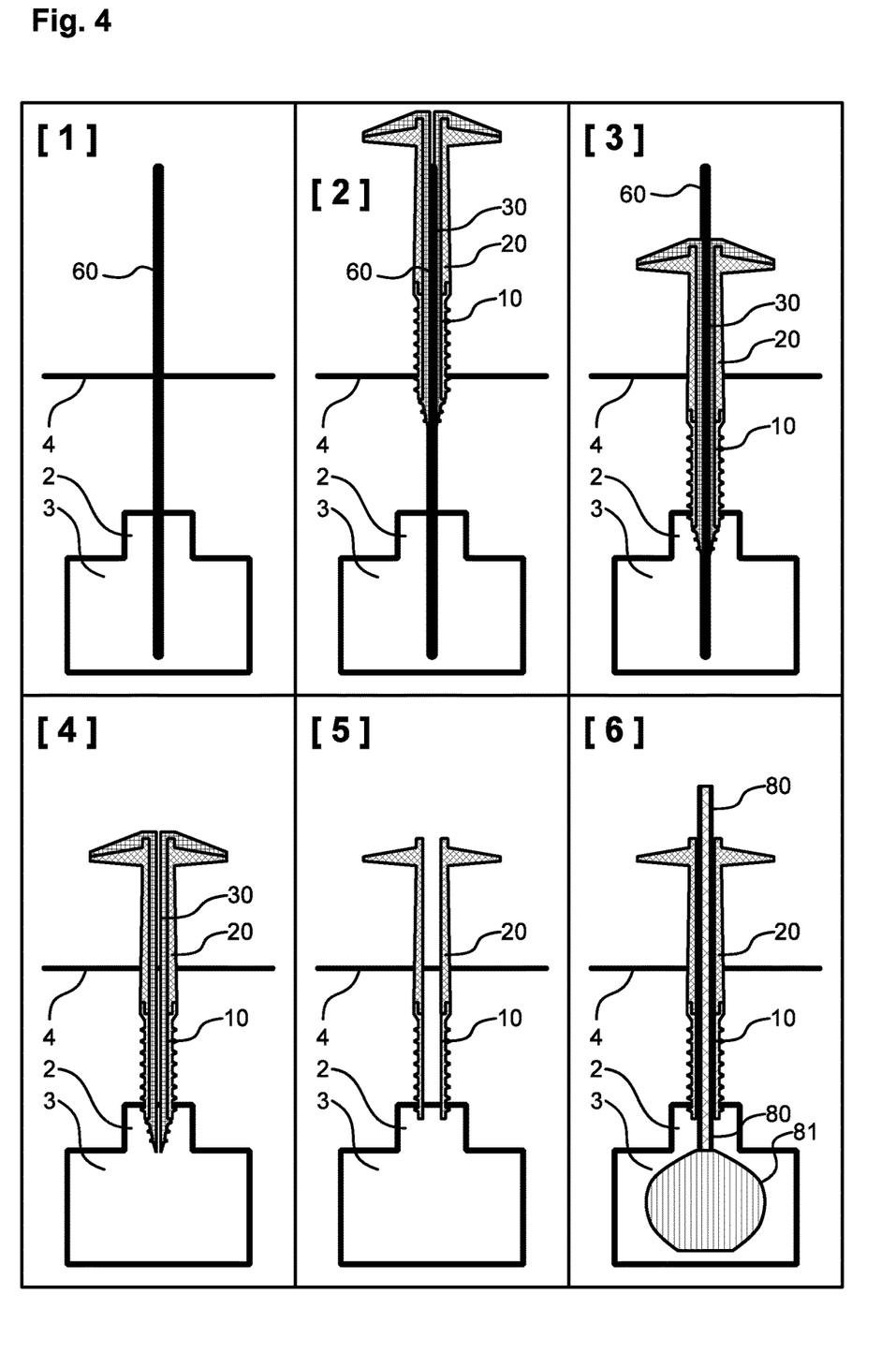
FIG. 4 is an explanatory view schematically illustrating a treatment procedure (first half) using the treatment device of the invention.
Figure 5:
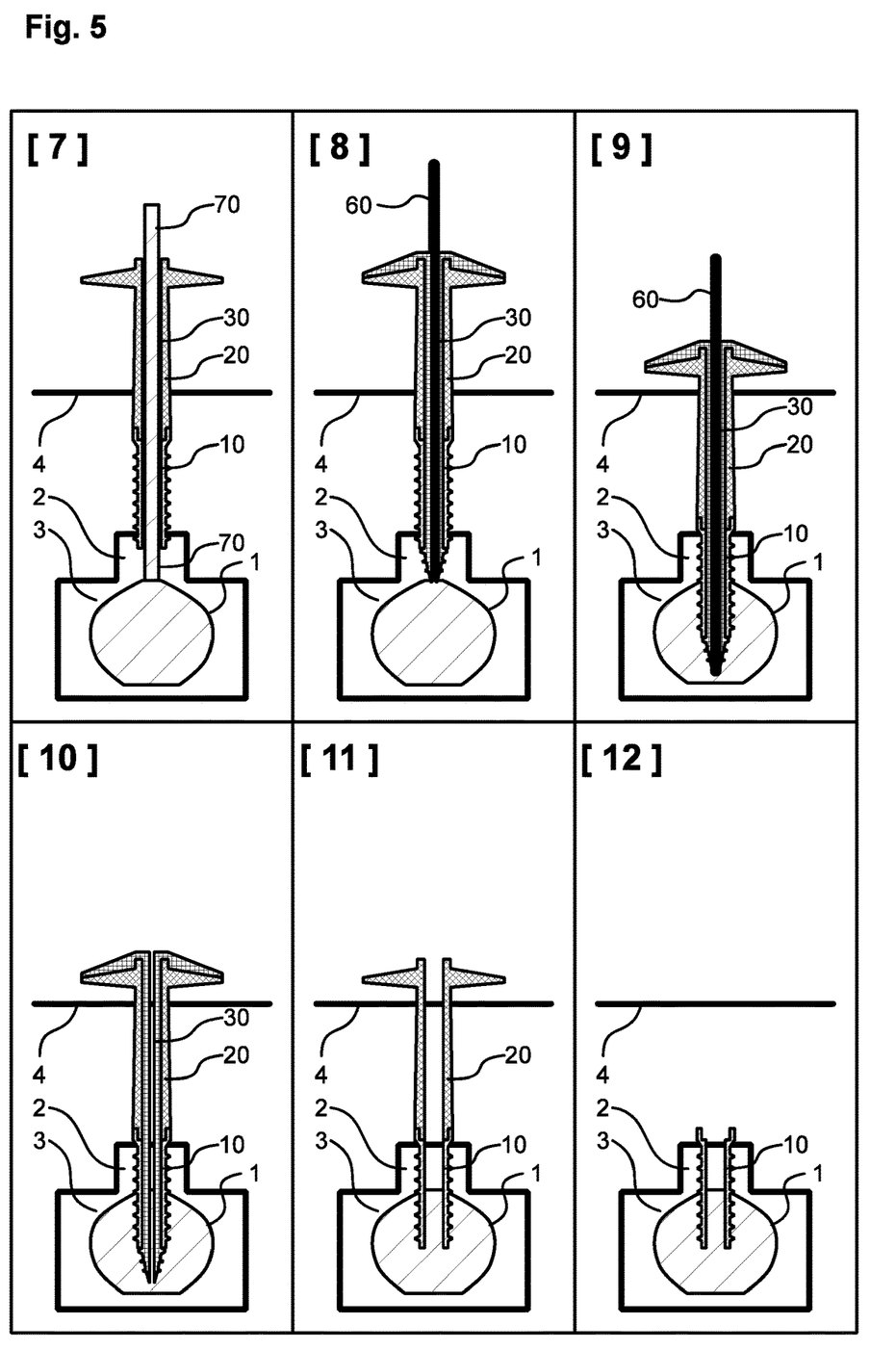
FIG. 5 is an explanatory view schematically illustrating the treatment procedure (second half) using the treatment device of the invention.

FIGS. 4 and 5 each is an explanatory view schematically illustrating a treatment procedure using treatment device 100 of the first embodiment. FIG. 4 illustrates the first half and FIG. 5 illustrates the second half, respectively, of the procedure. FIGS. 4 and 5 illustrate vertebroplasty, but the same method of insertion into the vertebral body is used for spinal fusion and vertebral body augmentation in artificial disc replacement surgery (not shown). FIGS. 4 and 5 schematically show a cross-section of the patient's affected area from the outside of skin 4 through pedicle 2 to vertebral body 3, with the upper side of the paper as the distal and the lower side as proximal. Similarly to FIG. 1 and other drawings, FIGS. 4 and 5 are drawn with a compressed scale toward the central axis (up and down on the paper) and with emphasis on the direction along the patient's body surface (left and right on the paper). Since pedicle 2 exists on each side of vertebral body 3, the same procedure is performed from the left and right of the same vertebral body 3, only one of them is illustrated in FIGS. 4 and 5.

Step 1 ([1]): from skin 4 on the patient's back body surface, incise and perforate subcutaneous tissue to reach vertebral body 3, which is an affected area, and then introduce guide pin 60 through pedicle 2 to reach vertebral body 3.

Step 2 ([2]): join screw 10 and driver 20 to each other, insert inner sleeve 30 into an inner through hole of screw 10 and driver 20 with the tip of inner sleeve 30 protruding from the tip of screw 10, combine them with the tip protruding from the tip of screw 10, and insert the inner sleeve 30 into the patient's body along guide pin 60 with the inner sleeve 30 covering guide pin 60.

Step 3 ([3]): push mutually-joined screw 10, driver 20, and inner sleeve 30 further proximally along guide pin 60 and drive the tips of inner sleeve 30 and screw 10 into pedicle 2.

Step 4 ([4]): remove guide pin 60 after mutually-joined screw 10, driver 20, and inner sleeve 30 is driven until the tip of screw 10 reaches near an entrance of vertebral body 3. At this time, notch 33 of inner sleeve 30 contacts the tip of screw 10 to deter inner sleeve 30 from spontaneously pulling out, but removal of guide pin 60 now allows tongues 31 to bend easily toward the central axis with the force of pulling inner sleeve 30 out, thereby inner sleeve 30 can be pulled out easily.

Step 5 ([5]): remove inner sleeve 30. At this time, since driver 20 is simply inserted into head 11 of screw 10, driver 20 should be held down not to be pulled out. Although not specifically illustrated, in this step, vertebral body drilling equipment may be introduced to excavate inside vertebral body 3 for cement filling and augmentation through penetration holes of driver 20 and screw 10, if necessary.

Step 6 ([6]): introduce cannula 80 into vertebral body 3 through the through holes of driver 20 and screw 10, and inflate balloon 81 in vertebral body 3. For example, balloon 81 is inflated by injecting contrast medium through cannula 80 and applying pressure. This is for restoring vertebral body 3 to its original size when vertebral body 3 is compression fractured due to osteoporosis or other factors.

Step 7 ([7]): pull cannula 80 out of the through holes of driver 20 and screw 10 and insert cement filling tube 70 instead to inject cement 1 into vertebral body 3. The volume of cement that can be filled through cement filling tube 70 at one time is about 1.5 ml; for example, in the case of vertebroplasty for fracture, vertebral body 3 is filled with about 10 ml of cement 1 by repeatedly delivering cement 6 or 7 times in total, about 3 times from each side. When the embodiment is applied to vertebral body augmentation of spinal fusion and artificial disc replacement other than vertebroplasty, the amount of cement filled should be adjusted according to bone conditions.

Step 8 ([8]): pull cement filling tube 70 out of through holes of driver 20 and screw 10.

Step 9 ([9]): drive screw 10 into the filled cement 1 using driver 20.

Step 10 ([10]): pull driver 20 out and suture the incised skin 4 to complete the treatment.

As described above, treatment device 100 of the invention is suitable for operative procedures of spine fusion, vertebral body augmentation in artificial disc replacement, vertebroplasty, and pediculoplasty since screw 10 can be driven into cement 1 immediately after the cement 1 is filled.

The filled cement 1 is soft enough to allow screw 10 to be driven into without tapping at thread 34 of tip 32 of inner sleeve 30. Similarly, screw 10 can be driven into pedicle 2 without tapping at tip 32 of inner sleeve 30.

Treatment device 100 of the invention is also suitable for removal of screw 10. First the affected area is incised and perforated to the screw head; then guide pin 60 is inserted into screw 10, and driver 20 is introduced along guide pin 60 to screw 10; and driver 20 is made to join to screw 10 simply by pushing the tip. Screw 10 can then be pulled out by rotating driver 20.

Second Embodiment

Screw 10 of the present invention may take the form of this second embodiment or the following third embodiment, or a combination thereof to further facilitate removal.

FIG. 6 is a schematic explanatory view of a cross-sectional structure illustrating an exemplary structure of screw 10 according to a second embodiment of the invention. The major diameter of thread 13 of screw 10 in the second embodiment may be tapered to be larger on the distal side ($d_a$) and smaller on the proximal side ($d_p$). For example, when shaft diameter ($d_s$)=5.0 mm, the major diameter $d_a$=6.5 mm on the distal side and the major diameter $d_p$=5.2 mm on the proximal side.

Figure 8:
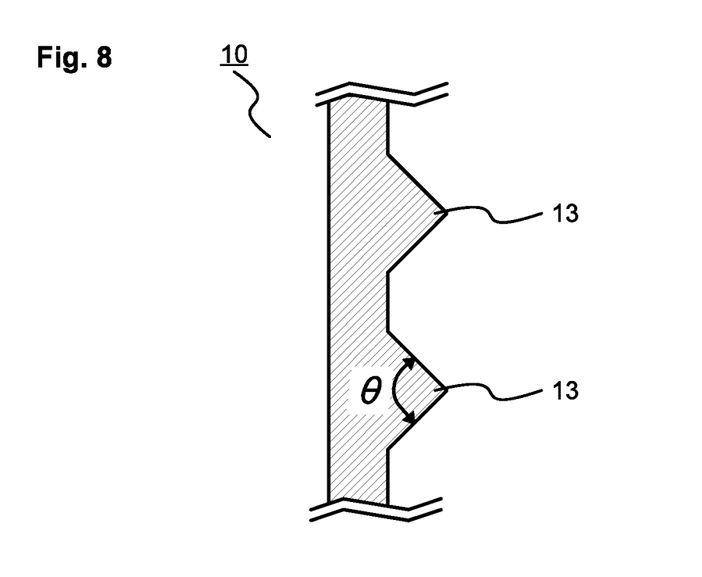
FIG. 8 is an explanatory view of a schematic cross-sectional view of an exemplary thread of the invention.
Figure 9:
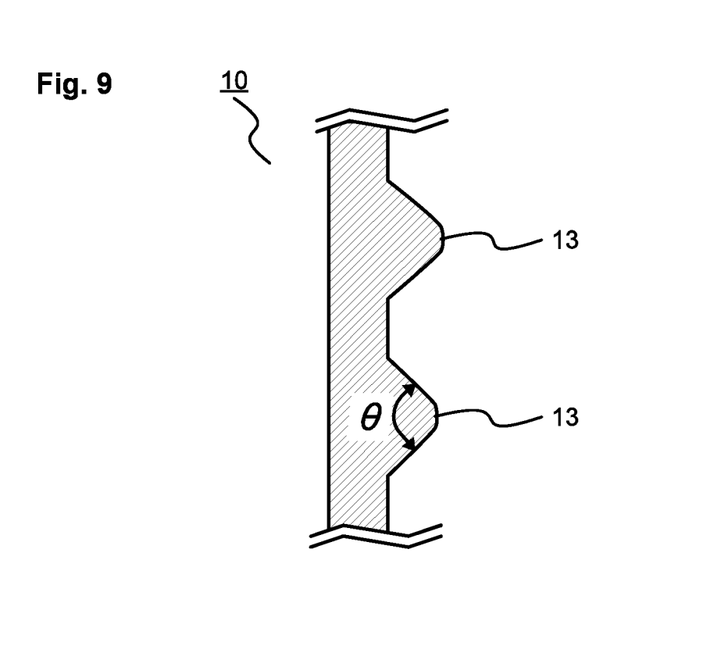
FIG. 9 is an explanatory view of a schematic cross-sectional view of another exemplary thread of the invention.

FIGS. 8 and 9 each is an explanatory view of a schematic cross-sectional view of an example of thread 13 of screw according to the invention. The thread angle $\theta$=60° in the example above, $\theta$ may be increased to $\theta$=90° as illustrated in FIG. 8. It is more desirable that the tip of thread 13 is smoothly chamfered as illustrated in FIG. 9. This can limit adverse effects even if thread 13 touches a nerve.

Third Embodiment

FIG. 7 is a schematic explanatory view of a cross-sectional structure illustrating an exemplary structure of screw 10 according to a third embodiment of the invention. The number of lead threads 13 of screw 10 of the third embodiment is larger on the distal side and smaller on the proximal side. Here, "the lead threads" refers to the crests in a thread, and the number of lead threads is a numerical value representing the number of crests together with roots involved therewith. In the example shown in FIG. 7, the screw is triple-lead threads in distal region T3, double-lead threads in middle region T2, and single-lead thread in proximal region T1. Assuming an operation of driving screw 10 in, screw 10 is screwed in with thread 13-1 in areas T2 and T3 following a thread groove that is formed by tapping by thread 13-1 in area T1. Since no second thread 13-2 exists in region T1, thread 13-2 in region T2 taps a thread groove, through which thread 13-2 in region T3 is screwed. Since no third thread 13-3 exists in areas T1 and T2, thread 13-3 in area T3 taps a thread groove, through which thread 13-3 is screwed. Tip 32 of inner sleeve 20 is also a single-threaded that is an extension of the single thread in region T1.

The number of regions and the lead threads may be changed as needed. For example, the screw may be sextuple-threaded in distal region T3, quadruple-threaded in middle region T2, and single-threaded in proximal region T1.

Gradually decreasing the number of lead threads toward the proximal side from the distal side can provide screw 10 easy to remove.

As also illustrated in FIG. 7, as in the second embodiment, the major diameter of thread 13 of screw 10 may also be tapered to be larger on the distal side ($d_a$) and smaller on the proximal side ($d_p$).

Also in the third embodiment, as described in the second embodiment, with reference to FIGS. 8 and 9, the thread angle $\theta$ may be set to about 90° or greater, and the thread may also be smoothly chamfered.

While the invention made by the inventor has been described in detail with respect to the embodiments, the invention is not limited thereto; various changes may be made therein without departing from the spirit and scope of the invention.

INDUSTRIAL APPLICABILITY

This invention relates to a treatment device, and more particularly to a treatment device suitable for use in surgery to fill affected bone with cement from inside in advance and drive a screw into the cement from outside of the bone.

EXPLANATION OF SIGN

1 Cement
2 Pedicle of vertebral arch
3 Vertebral body
4 Skin
8 Cavity in vertebral body
10 Screw
11 Screw head
12 Outer wall of screw
13 Screw thread
20 Driver
25 Connecting portion with inner sleeve
26 Male thread
27 Driver's handle
30 Inner sleeve
31 Tongue of inner sleeve
32 Tip of inner sleeve
33 Notch
34 Thread at tip of inner sleeve
35 Connecting point with driver
36 Female thread
37 Handle of inner sleeve
60 Guide pin
70 Cement filling pipe
80 Cannula
81 Balloon
100 Treatment device

The invention claimed is:
1. A treatment device comprising: a screw; a cylindrical driver configured to drive the screw into bone; an inner sleeve configured for insertion into the driver; and a guide pin configured for insertion into the inner sleeve, wherein:
the screw includes on an outer wall a thread that can tap into bone, and a through hole that allows the inner sleeve to pass from a head to a tip of the screw along a central axis in a through hole of the driver and the through hole of the screw; and the driver is configured to fit onto the head of the screw and when moved along the central axis be joined to the screw to transmit torque about the central axis to the screw;

the inner sleeve can be inserted from a distal end of the driver and has a distal end configured to be connected to the distal end of the driver in a state in which the driver and the screw are joined together, and a tip of the inner sleeve protrudes more proximally than the tip of the screw; and the inner sleeve is connected to the screw when the guide pin is inserted in a through hole of the inner sleeve with the tip of the inner sleeve protruding more proximally than the tip of the screw.

2. The treatment device according to claim 1, wherein:

a proximal end of the inner sleeve is divided into a plurality of tongues in a direction along the central axis, the plurality of tongues having a protrusion in a direction away from the central axis;

when the inner sleeve is inserted into the joined driver and screw, the tongues bend toward the central axis to allow the inner sleeve to move along the central axis in the through holes of the driver and the screw; and when the inner sleeve is inserted into the joined driver and screw and is connected at its distal end with the distal end of the driver, the guide pin can be inserted into the inner sleeve, thereby regulating the plurality of tongues not to bend toward the central axis, and the protrusion is brought into contact with the tip of the screw, thereby regulating movement of the inner sleeve distally along the central axis.

3. The treatment device according to claim 1, wherein the inner sleeve comprises on an outer surface a thread that can tap a hole.

4. The treatment device according to claim 1, wherein a major diameter of the thread of the screw is larger on a distal side and smaller on a proximal side.

5. The treatment device according to claim 1, wherein a number of lead threads in the thread of the screw is larger on a distal side and smaller on a proximal side.

6. The treatment device according to claim 1, wherein:

a major diameter of the thread of the screw is larger on a distal side and smaller on a proximal side; and a number of lead threads in the thread of the screw is larger on the distal side and smaller on the proximal side.

7. The treatment device according to claim 1, wherein:

the tip of screw is rounded.

\* \* \* \* \*